US008436836B2

(12) United States Patent
Njølstad et al.

(10) Patent No.: US 8,436,836 B2
(45) Date of Patent: May 7, 2013

(54) METHOD AND APPARATUS FOR FORMING, PROJECTING AND DETECTING A CODED PATTERN IMAGE WITH A CAMERA AND RECOGNITION SYSTEM

(75) Inventors: Tormod Njølstad, Trondheim (NO); Mikael Lindgren, Trondheim (NO); Øystein Damhaug, Trondheim (NO); Sedsel Fretheim Thomassen, Åsmarka (NO)

(73) Assignee: Epson Norway Research and Development AS, Trondheim (NO)

( * ) Notice: Subject to any disclaimer, the term of this patent is extended or adjusted under 35 U.S.C. 154(b) by 1105 days.

(21) Appl. No.: 11/719,065

(22) PCT Filed: Nov. 2, 2005

(86) PCT No.: PCT/NO2005/000416
§ 371 (c)(1),
(2), (4) Date: Feb. 7, 2008

(87) PCT Pub. No.: WO2006/135241
PCT Pub. Date: Dec. 21, 2006

(65) Prior Publication Data
US 2009/0040195 A1   Feb. 12, 2009

(30) Foreign Application Priority Data
Nov. 12, 2004   (NO) .................................... 20044936

(51) Int. Cl.
*G06F 3/041*   (2006.01)
*G06F 3/033*   (2006.01)

(52) U.S. Cl.
USPC .................... 345/179; 345/175; 178/19.05

(58) Field of Classification Search .......... 345/179–183; 178/19.05
See application file for complete search history.

(56) References Cited

U.S. PATENT DOCUMENTS 5,572,251 A   11/1996 Ogawa
5,712,658 A * 1/1998 Arita et al. .................... 345/158
(Continued)

FOREIGN PATENT DOCUMENTS

EP   0515015 A2   11/1992
EP   0718748 B1   5/2002
WO   0023938 A1   4/2000

*Primary Examiner* — Bipin Shalwala
*Assistant Examiner* — Steven Holton
(74) *Attorney, Agent, or Firm* — Oliff & Berridge, PLC (57) ABSTRACT

Method and apparatus (16) for projecting infrared or near infrared or low intensity visible light from a pen, pointer or other guiding object in the form of a coded pattern image, detectable by a camera and recognition system but invisible, or hardly visible to the user and audience, thus controlling and interacting with a computer (19) during a presentation, computer supported work and/or other interactive use of a computer, including pointing, selecting, drawing and writing, both distantly (11) and closely (10) to the front or rear projection screen or possible other type of display screen, without any distracting visual patterns or spots, while the possible visual feedback to the user and audience can be generated by the computer and display system onto the display screen in a controlled and context-sensitive way. The projected complex images from the positioning device when operating remotely (11) and when operating closely to the screen (10), are created by optical alignment of one or several diffractive optical elements, collimating lens and/or mirrors, and one or more light sources. The light sources can preferably be laser diodes or light emitting diodes. In a preferred embodiment, the light sources are emitting visible, infrared or near-infrared light.

19 Claims, 12 Drawing Sheets

U.S. PATENT DOCUMENTS

| | | | |
|---|---|---|---|
| 5,793,361 A * | 8/1998 | Kahn et al. | 345/179 |
| 5,938,308 A | 8/1999 | Feldman et al. | |
| 5,953,001 A * | 9/1999 | Challener et al. | 345/179 |
| 5,959,617 A * | 9/1999 | Bird et al. | 345/182 |
| 6,900,791 B2 * | 5/2005 | Tanaka et al. | 345/156 |
| 7,142,198 B2 * | 11/2006 | Lee | 345/180 |
| 7,205,527 B2 * | 4/2007 | Li et al. | 250/221 |
| 2001/0022575 A1 | 9/2001 | Wolfgang | |
| 2004/0141156 A1 * | 7/2004 | Beardsley et al. | 353/69 |

\* cited by examiner

METHOD AND APPARATUS FOR FORMING, PROJECTING AND DETECTING A CODED PATTERN IMAGE WITH A CAMERA AND RECOGNITION SYSTEM

CROSS REFERENCE TO RELATED APPLICATION

This application is a 35 U.S.C. §371 National Phase Entry Application from PCT/NO2005/000416, filed Nov. 2, 2005, and designating the United States.

FIELD OF THE INVENTION

This invention relates to the projection of an infrared or near infrared image onto a reference surface from a projection device placed on a guiding object, pen or pointer in order to be able to find and continuously follow the image position and also the orientation of the guiding object, pen or pointer relative to the reference surface. It also relates to an apparatus, a system and the method of finding and following the image position and the orientation of the guiding object, pen or pointer.

DESCRIPTION OF THE PRIOR ART

The published international patent application WO0227461 relates to a drawing, writing and pointing device for data presentations, computer supported office work and/or other interactive use of a computer. The invention is also related to a camera and recognition system for interaction with a drawing, writing and pointing device for data presentations, computer supported office work and/or other interactive use of a computer. The prior invention is further related to a system for drawing, writing and pointing which is suitable for data presentations, computer supported office work and/or other interactive use of a computer, comprising a drawing, writing and pointing device, a camera and recognition system in addition to a computer system with a projection screen, a computer screen, a flat screen or a virtual screen. It is also related to a method of drawing, writing or pointing at data presentations, computer supported office work or other interactive use of a computer, and also to a method of continuous detection of the position and orientation of one or a multiple of marked objects. Each marked object comprises one or more code patterns. Each code pattern is adapted to be detected by a camera and recognition system. The code patterns are selected such that they have good auto-correlation and cross-correlation properties.

The U.S. Pat. No. 5,938,308 describes a hand-held pointer which is able to project an image onto another image in order to assist a person in the description of this second image. This involves use of a laser source or another coherent light source and a diffractive optical element to produce a desired image like a complex pattern image, i.e. an arrow or a company logo. Energy is conserved by using such diffractive optical element by redirecting substantially all of the light generated, compared to the use of masks or slides which block out portions of the light in the image creation process. The teachings of WO 0227461 as well as U.S. Pat. No. 5,938,308 are hereby incorporated herein by reference, since it does not seem to be required here to explain the principles and methods already described in those two patent specifications. The purpose of U.S. Pat. No. 5,938,308 is to produce a complex pattern image of an arrow etc with high visibility which is easily seen by the audience. Its purpose is not to track the pattern image by a camera recognition system.

SUMMARY OF THE INVENTION

The present invention, in one aspect, relates to the projection of an infrared or near-infrared image or possibly a low intensity visible light image onto a reference surface from a projection device comprised by a guiding object, pen or pointer in order to be able to find and continuously follow the image position and also the orientation of the guiding object, pen or pointer relative to the reference surface. In this connection it is important to make the pattern image invisible or hardly visible for a human being by using infrared or near infrared light or by using low intensity visible light. Reference surface in this context may be taken as any form of display surface or the like, comprising an arbitrary 3-dimensional surface, a plane surface, a rear projection screen (with a projector at the back side), a front projection or display screen, such as an LCD or CRT screen, oriented more or less vertically, as well as a table top surface.

It is another aspect of the present invention to track the pattern image by a camera recognition system as in WO0227461 and to find and report the image position and orientation continuously as an input device to a computer system. It is envisaged that the projected image comprises one or more code patterns which have good auto-correlation and cross-correlation properties as described in WO0227461. According to the present invention the pattern image is made hardly visible or essentially invisible for a human being by using very low changes in intensity levels or by using infrared or near-infrared light at a relatively narrow wavelength band. This obtained, inter alia, by providing a projection device comprising diffractive optical elements, being per se known in the art.

The detection of the projected image position may be performed by a camera and recognition system as in WO0227461, to find and report the image position and orientation continuously as an input device to a computer system.

In the claims the novel and specific features of the system according to the invention, as well as an apparatus and a guiding object for use in the system, are set out.

It is further an aspect of the present invention to be used for different displays including front projection systems and rear projection systems for distant operations and for close to the screen operations. Distant operations will typically be, but not limited to, pointing, selecting, drag-and-drop operations. Near the screen operations will typically be, but not limited to, pointing, selecting, drag-and-drop, writing, drawing and erasing.

An important advantage is obtained by the present invention in that the pattern image projected from the guiding object, the pen or the pointer is not directly visible, or is only hardly visible, for a human being. Hardly visible or essentially invisible in this context means that for all practical purposes the pattern image will be negligible within a total image displayed to an audience or user(s). Therefore the image will not be distracting the presenter nor the audience, while the computer system which receives the position and orientation of this pattern can make a desired visual feedback to the presenter and audience like an arrow, a drawing or writing stroke sequence or e.g., a selection of an object on the computer-generated screen.

Moreover, according to this invention the wavelength used can be of infrared or near infrared radiation, well outside the human vision wavelength range used in the data projector systems. Thus, the energy required to make the image pattern detectable by the camera recognition system is much lower than it needed to be in order to make an arrow or logo of visible light clearly visible to the presenter and audience in the presence of very high light intensity from the data projector.

It is a further feature of the present invention that the camera recognition system may be equipped with an optical filter which blocks the projector light but passes through the infrared or near infrared light, making the detection process insensitive to other patterns in the data projector images of visible light.

It is still another aspect of the present invention that the infrared or near-infrared light also may be coded in the guiding object, pen or pointer and be decoded by an infrared remote control decoder placed along with the camera to give information of the actual state and actual events of the guiding object, pen or pointer. This may also include information regarding user identification.

In an alternative embodiment, an infrared emitter may also be placed along with the camera and recognition system, while an infrared receiver and decoder is placed inside the guiding object, the pen or the pointer. With such a two-way infrared communication link the energy consumption may be kept to a minimum, since the transmit energy may be regulated to a lowest possible level while maintaining robust communication.

It is a further advantage of the present invention that only low intensity operation of the infrared laser or the LED source is required for being detectable by the camera and recognition system, since there are usually no other significant light sources in the near infrared bandwidth range. Furthermore, since the light is spread over a projected image instead of being concentrated in a small spot, laser safety requirements are more easily satisfied.

DEFINITIONS

1) With near-infrared light or near-infrared radiation is meant electromagnetic radiation of wavelength 750-1300 nm
2) With infrared light or infrared radiation is meant electromagnetic radiation of wavelength >1300 nm.
3) With visible light or visible radiation is meant electromagnetic radiation of wavelength 400-750 nm, i.e., light normally detected by humans.
4) With a symmetric pattern or image is meant an image that is possible to "invert". Strictly, there is an origin (x,y=0,0) near the center of the image so that if pixel points x,y are replaced by the symmetry operation -x,-y, it results in the same, or essentially the same, pattern or image.
5) With an asymmetric pattern or image means a pattern or image that is not possible to invert according to the symmetry operation in DEFINITION (4) above, and to obtain the same or a very similar pattern or image. It is "asymmetric" (not symmetric) with respect to the symmetry operation defined in DEFINITION (4) above.

DETAILED DESCRIPTION OF THE PREFERRED EMBODIMENTS

Embodiments of the present invention will be described below with reference to the accompanying drawings, while also additional novel and specific features according to the invention will be apparent.

Firstly, the principle for generating an infrared image using a diffractive optical element is described Thereafter the detailed description of some preferred embodiments are described along with detailed system operation principles.

The present invention in the one aspect mentioned above, relates to the projection of a near-infrared or infrared image or a low intensity visible light image onto a reference surface. In this context reference surface is considered to comprise any form of display, such as an arbitrary 3-dimensional surface, a plane surface or a rear projection screen, or possibly a front projection screen. Instead of a more or less vertical surface there may also be a table top surface.

Figure 13:
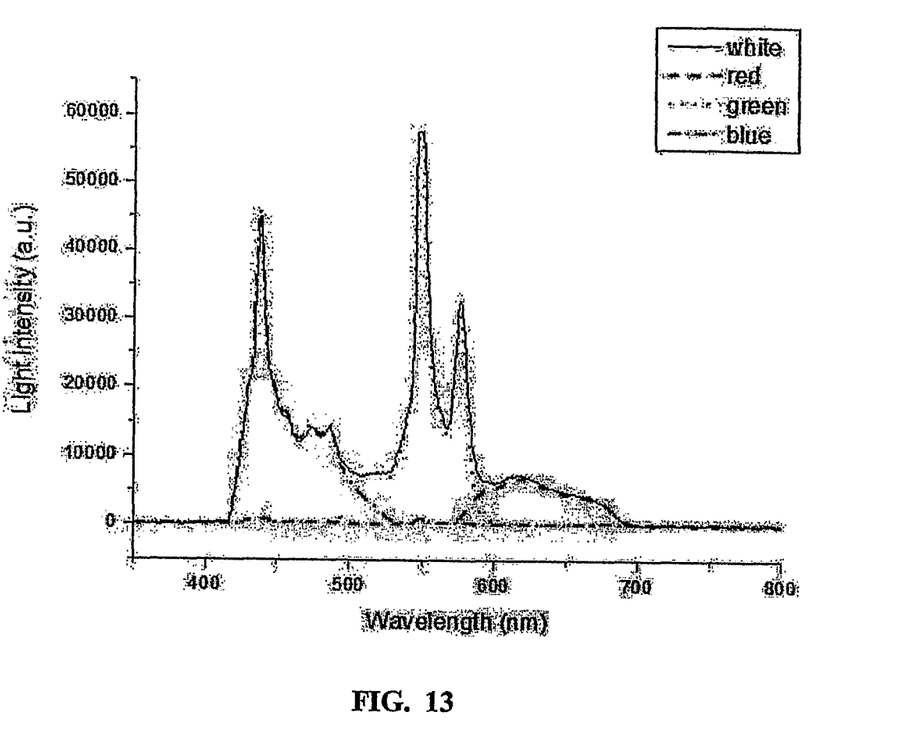
FIG. 13 is an example of the spectrum from a typical data projector for a given RGB-setting, displayed on a front projection screen 1 meter from the data projector and recorded using a calibrated spectrum analyzer.

The intensity distribution of the image is selected to have good auto-correlation and cross-correlation properties. The image formed from near-infrared or infrared light is in the sensitivity range of the camera system used to locate and track the pattern. The spectral output of a representative data projector is shown in FIG. 13. As can be seen, the light is confined to the wavelength range approximately of 400-700 nm. Hereby, the light used to simultaneously project another image using the data projector is not interfering with the near-infrared or infrared image, and its associated camera detection system, since the wavelength used is different from those used by the data projector.

Figure 14:
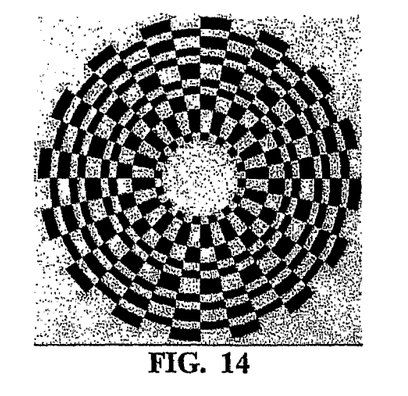
FIG. 14 illustrates a preferred type of pattern image to be projected by the projection device according to the present invention.

An example of such a pattern image with good auto-correlation and cross-correlation properties as well as circular symmetry is shown in FIG. 14. Here, and in all further intensity plots, the gray scale colors are inverted due to document printing quality reasons, such that the white and black colors are used to present low and high light intensity, respectively. Only a fraction of the image as depicted in FIG. 14 is required to locate and track the center of the whole pattern based on the methods and systems described in WO0227461. The projected patterns from the preferred embodiments of the present invention can be described geometrically as part of conic sections, and can thus be analysed further to find the actual azimuth and elevation orientation angles and the distance of the pen relative to the reference surface. To obtain an accurate positioning of the pattern using the camera and recognition system the image must have sharp and well defined edges or alternatively be distributed over a larger area with lower contrast and sharpness requirements.

A preferred embodiment for projecting the image is by using a computer generated diffractive optical element and an infrared diode laser. A phase pattern of a diffractive optical element needed to generate a pattern as in FIG. 14 is readily made by computer calculations. There exist a vast number of computational methods to compute the diffractive optical element pattern, as reported in the scientific and technical literature [ref: Jakob Blad; "New Design Method for Diffractive Optics", Chalmers University of Technology, Göteborg (2003), pp. 15-23].

Figure 15:
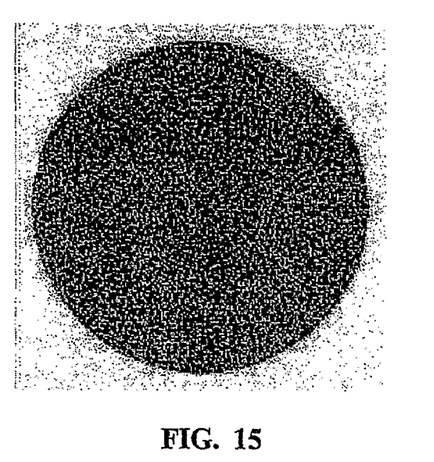
FIG. 15 shows a phase pattern generated by the so called "Gerschberg-Saxton algorithm" to iteratively obtain a phase pattern to be used as the diffractive optical element to give the desired intensity pattern as displayed in FIG. 14.

FIG. 15 shows a phase pattern generated by using the so called "Gerschberg-Saxton algorithm" [ref: Jörgen Bengtsson, "Diffractive Optics Design", Chalmers University of Technology, Göteborg (1997), pp. 25-27] to iteratively obtain a phase pattern that can be used as the diffractive optical element to give an approximate intensity pattern as that displayed in FIG. 14.

Figure 16:
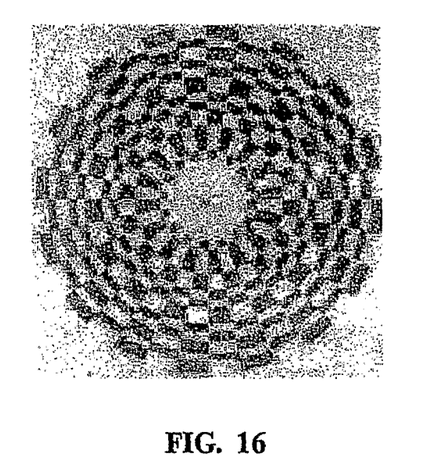
FIG. 16 shows a simulation of the resulting intensity pattern obtained in the far-field, or alternatively, by using a system with lenses and/or curved mirrors, obtained in vicinity of the diffractive optical element.
Figure 17:
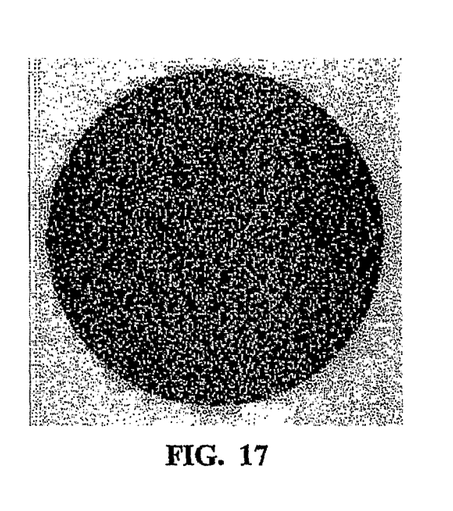
FIG. 17 shows the phase pattern generated for forming an asymmetric part of the desired intensity pattern of FIG. 14.
Figure 18:
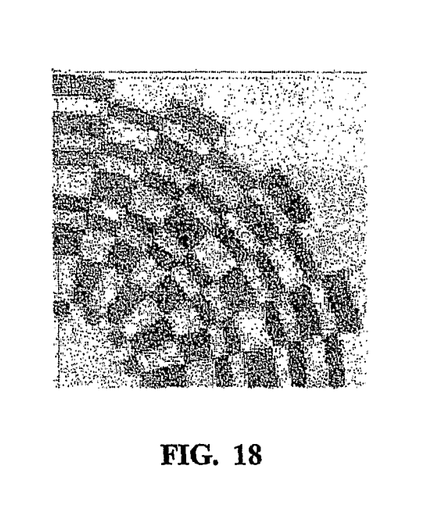
FIG. 18 shows the resulting intensity pattern obtained in the far-field.

The gray-scale plot in FIG. 15, inverted here for document printing quality reasons, represents phase-levels in the range $[0\ 2\pi]$ as distributed over the diffractive optical element. The corresponding "diffracted image" in terms of its Fourier transform is depicted in FIG. 16. Here 256 pixels were used in the diffractive optical element at 16 phase levels, and it is seen to reproduce approximately the same intensity distribution as in FIG. 14 apart from reduction in light level intensity due to diffraction losses. Provided the light intensity level is high enough in the gray areas in FIG. 16, a threshold in the detection camera system can be used to encode these as "bright/white" (recall that FIGS. 14-24 are inverted). FIG. 17 shows that the phase pattern for the corresponding intensity distribution of an asymmetric pattern (with similarities to a part of the pattern in FIG. 14) can be generated using the same algorithm using the same number of pixel resolution in the diffractive optical element and the same number of phase levels (concerning meaning of "asymmetric", see DEFINITION (5)).

Figure 19:
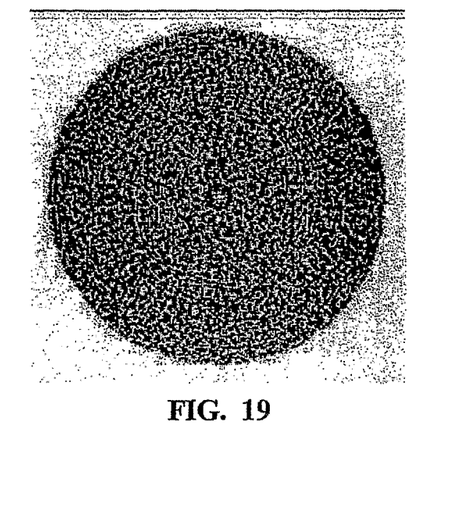
FIG. 19 shows the two discrete phase levels phase gratings of the desired symmetric intensity pattern as shown in FIG. 14.
Figure 20:
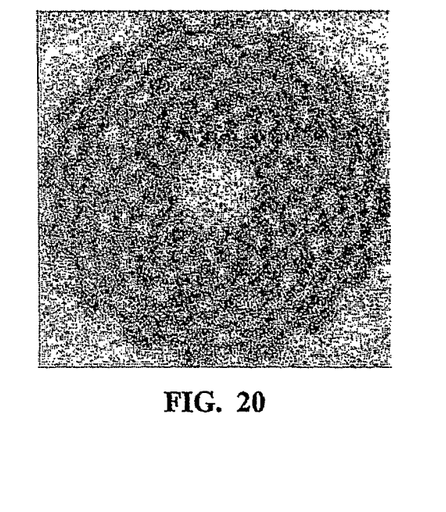
FIG. 20 shows the resulting intensity pattern obtained in the far-field.
Figure 21:
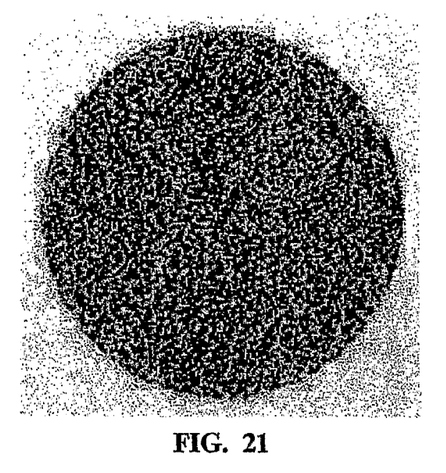
FIG. 21 shows the two discrete phase levels phase gratings of an asymmetric part of the desired intensity pattern of FIG. 14.
Figure 22:
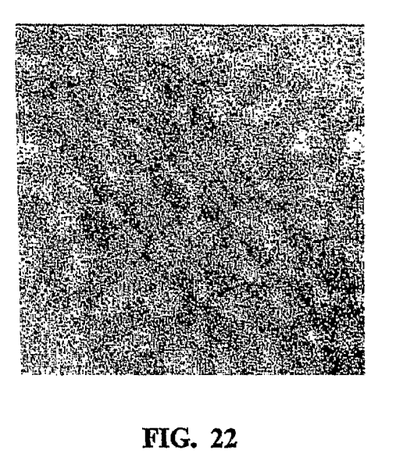
FIG. 22 shows the resulting diffraction pattern with severe errors due to the non-capability of a phase-only two discrete phase levels diffraction grating to produce an asymmetric pattern.

To use a two discrete phase levels-gratings is interesting due to its simplicity in manufacturing and design. A two discrete phase-only grating can be used to generate any symmetric diffraction pattern without interference and mixing of the positive and negative orders (concerning meaning of "symmetric" see DEFINITION (4)). The diffractive optical element and corresponding diffraction pattern for the image in FIG. 14 is displayed in FIG. 19 and FIG. 20, respectively. As seen, for the same number of pixels essentially the main features of the desired pattern is reproduced, however, the resolution is lower owing to the restricted flexibility of the two discrete phase levels of the diffractive optical element. In FIG. 22 the result from attempting to generate an asymmetric pattern using the two discrete phase level grating of FIG. 21, is shown. As seen, the resulting diffraction pattern in FIG. 22 is a superposition of the original pattern and its inverted image. This is due to the difficulty of a phase-only two discrete phase level diffraction grating to produce an asymmetric pattern.

Figure 23:
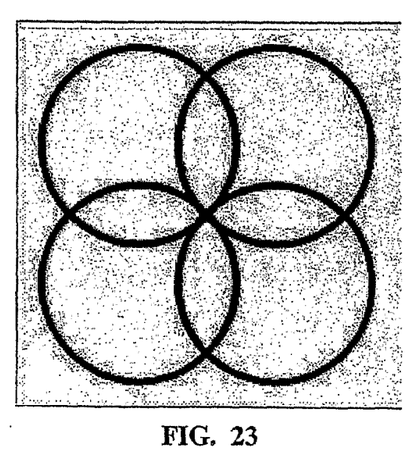
FIG. 23 shows an example of a simple symmetric intensity pattern that can be made by a phase-only two discrete phase levels diffractive grating.
Figure 24:
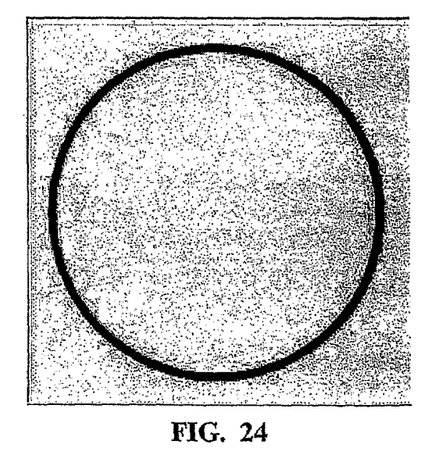
FIG. 24 shows another example of a simple symmetric intensity pattern that can be made by a phase-only two discrete phase levels diffractive grating.

Thus, a phase-grating of more than two phase-levels will be a pre-requisite for producing an asymmetric pattern used in the detector camera system. Moreover, it will generally give better image quality compared to the two discrete phase levels grating when used with the same pixel resolution. Other examples of simple symmetric patterns that also can be made by two discrete phase levels diffraction gratings are displayed in FIG. 23 and FIG. 24. The image pattern as in FIG. 24 can be used to estimate the angular spread of the diffracted pattern owing to the resolution of the grating. Consider an arbitrary line intersecting the circle through the origin. This constitutes a "linear model" of the two-dimensional circle, with two diffracted spots on each side of the origin. The angular deviation of a laser beam from the original beam direction by a one-dimensional diffractive grating can be estimated from the formula:

$$\sin\alpha = \frac{\lambda}{\Delta \cdot \Lambda}.$$

$\alpha$ is the fan out angle as applicable for the first order diffraction steering of a laser beam by a one-dimensional blazed grating [ref: E. Hällstig, L. Sjöqvist, M. Lindgren; Opt. Eng. Volume 42(3) (2003) pp. 613-619]. Here, $\lambda$ is the wavelength of the light (unit is length), $\Delta$ is the pixel-pitch (unit is length) and $\Lambda$ is the period of the grating in pixels. The pixel-pitch can be estimated from the resolution of creating the grating and for typical diffractive optical element produced on polymer materials or micro-machined silicon the resolution is typically 0.5 μm or better. Hence it is possible to have 1 μm as pixel pitch. The wavelength is taken as 850 nm being in the near-infrared range. Using 4 phase levels equally spaced between 0 and $3\pi/4$ radians gives the maximum diffracted $1^{st}$ order diffracted beam to be at an angle given by: $\sin\alpha \approx 0.2125$ and an angle of approximately 12°. Hence, 5 cm of free space propagation after reflection onto a two-dimensional grating (or transmission through) with similar resolution and phase-level accuracy can be used to produce an approximately 2 cm diameter circle or similar pattern. It is noted that a higher resolution or a smaller pixel pitch could generate an even larger angular spread. Suggestions of embodiments that can provide the diffracted pattern as an image in close vicinity (<approx. 10 cm) of the diffractive optical element is discussed in the following.

The diffraction phenomenon generates a Fourier transform of any amplitude and phase distribution on the diffractive optical element in the "far-field". Alternatively, the Fourier transform can be moved from the far-field to become closer to the output from the diffractive optical element by using a lens or spherical mirrors acting as a lens, placed in vicinity of the diffractive optical element. The phase distribution of a lens or a curved mirror has the property to move the Fourier transform of a planar wave-front to the focal plane. Using two or more lenses, curved mirrors, or combinations thereof the position and size of the Fourier transform pattern relative to the diffractive optical element and laser diode can be controlled.

Diffractive optical element with phase distribution patterns as in FIG. 15 can be provided by manufacturers of diffractive optical elements. These can be in the form of transmissive or reflective components. These components can be used in alternative embodiments of the present invention in optically alignments with optical elements like lenses, mirrors and light sources, as illustrated in FIG. 1-FIG. 4.

Figure 1:
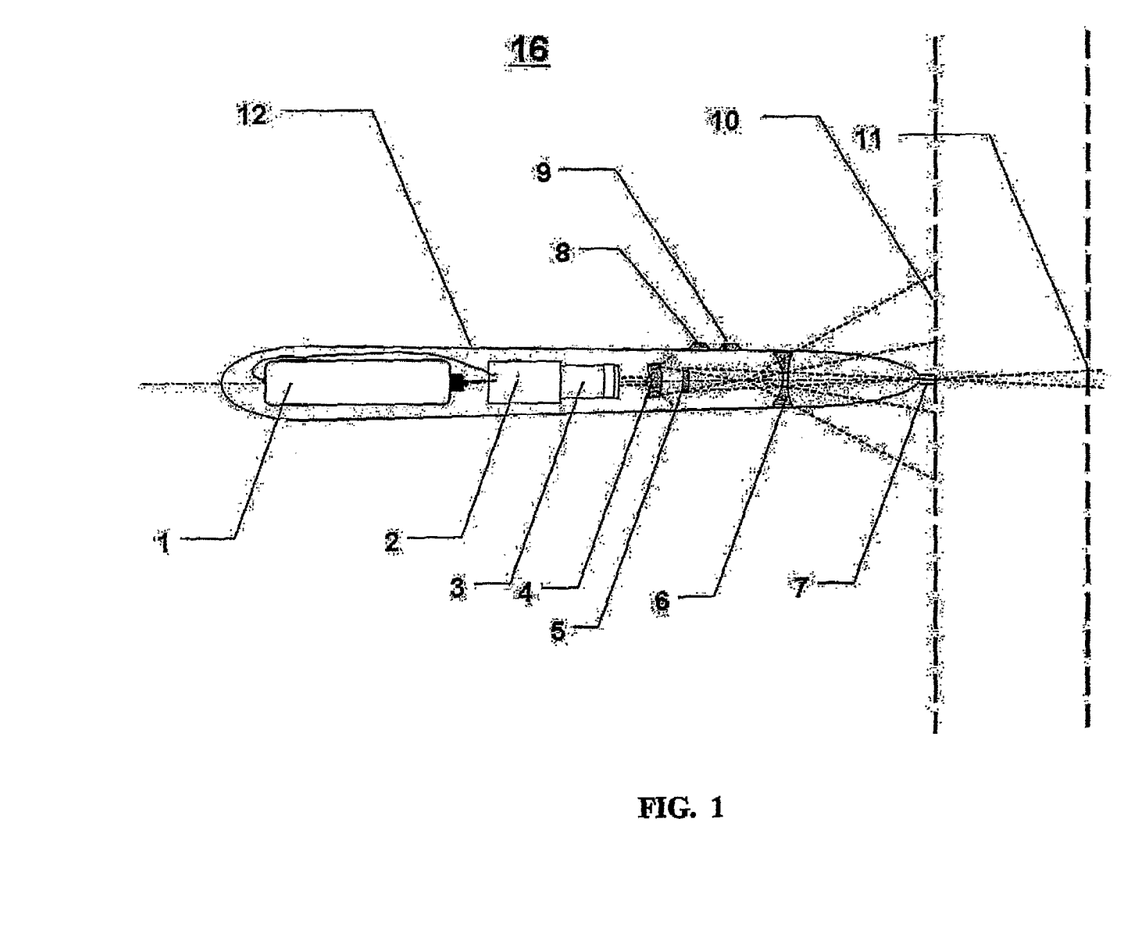
FIG. 1 is a schematic axial section of a projection device for positioning using transmissive diffractive optical elements according to a preferred embodiment of the present invention.
Figure 2:
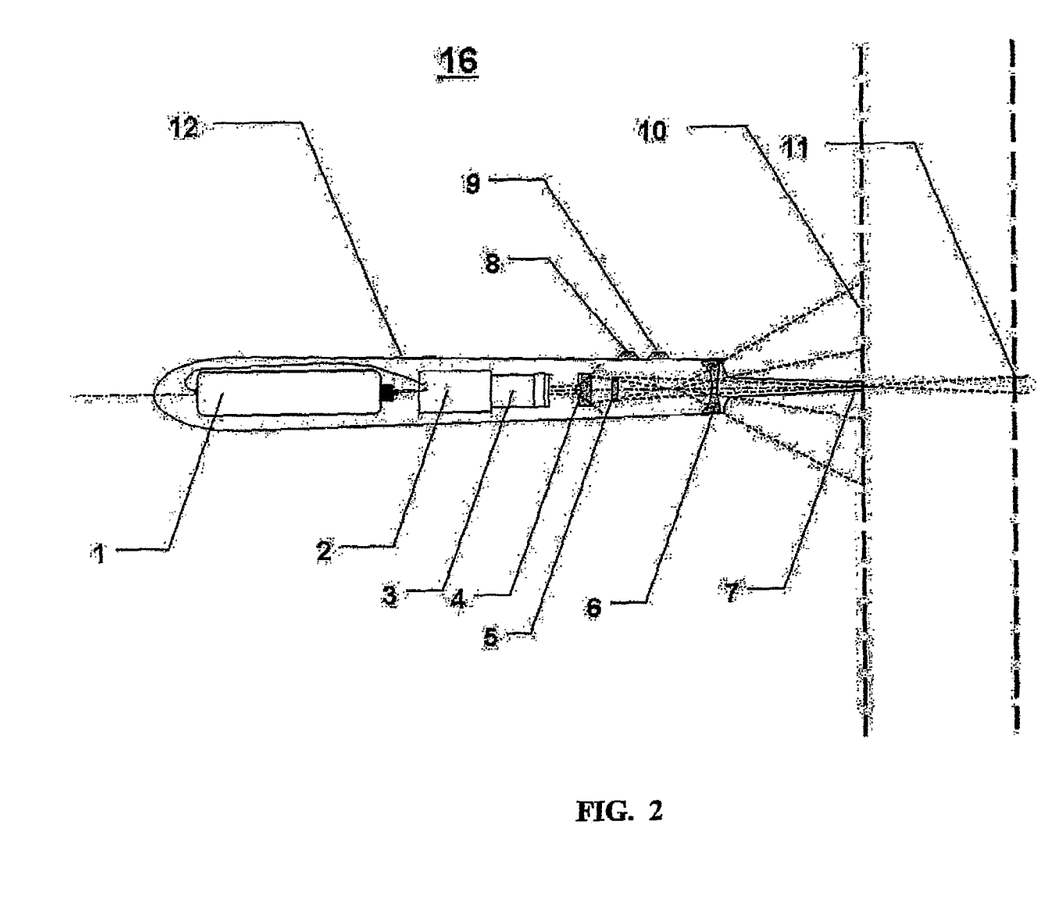
FIG. 2 is a schematic axial section of another preferred embodiment with the same optical alignment of optical elements as FIG. 1 but with a slimmer tip.

Referring to FIG. 1 and FIG. 2, the guiding device 16 (pen, pointer) with a casing 12 has a battery 1, a printed circuit board 2, a laser diode 3, a refractive collimating lens 4, a transmissive diffractive optical element 5, a lens 6, a tip 7, two buttons 8 and 9. A resulting pattern 10 is projected from the guiding device to the screen when operated closely, and a pattern 11 is projected from the guiding device to the screen when operated distantly.

Figure 3:
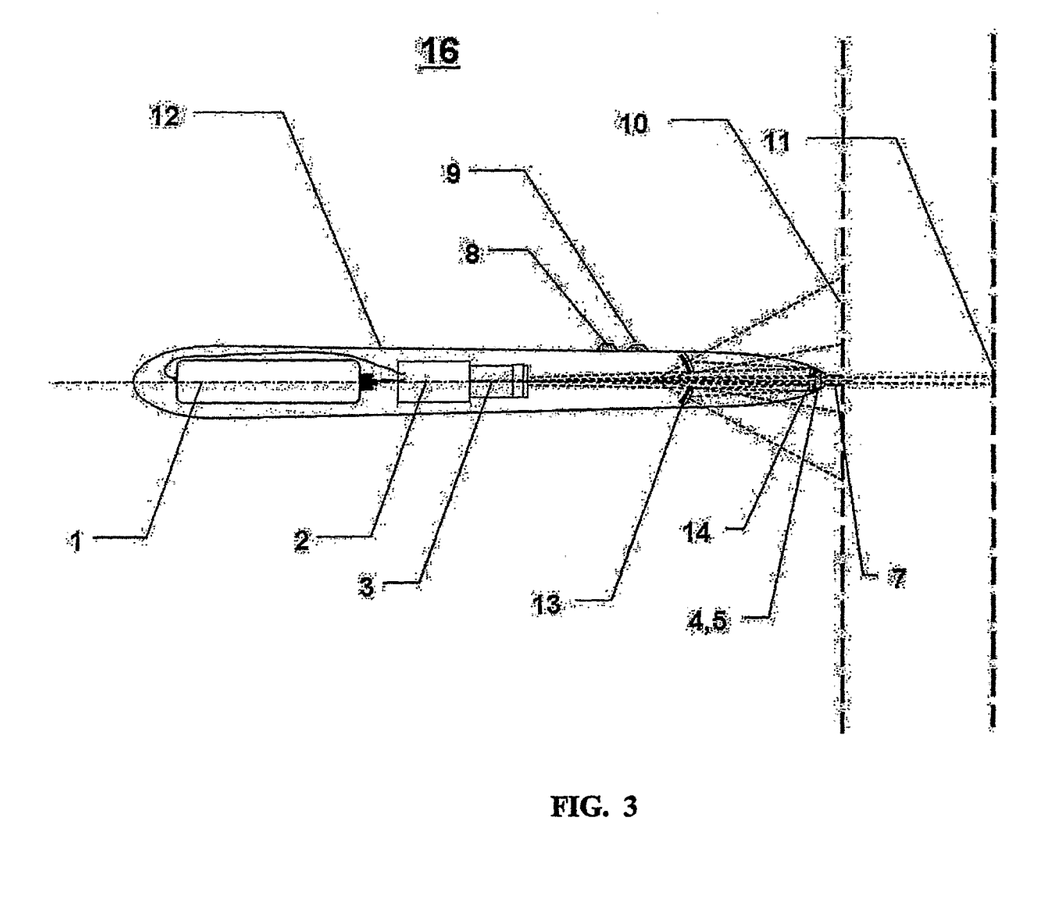
FIG. 3 is a schematic axial section of a projection device for positioning using reflective diffractive optical element according to a preferred embodiment of the present invention.

Referring to FIG. 3, the guiding device 16 (pen, pointer) with a casing 12 has a battery 1, a printed circuit board 2, a laser diode 3, a transmissive diffractive optical element 5 with or without a lens 4 mounted near the tip 7, a reflective diffractive curved annular mirror 14 and a curved annular mirror 13, two buttons 8 and 9. A resulting pattern 10 is projected from the guiding device to the screen when operated closely, and a pattern 11 is projected from the guiding device to the screen when operated distantly.

Figure 4:
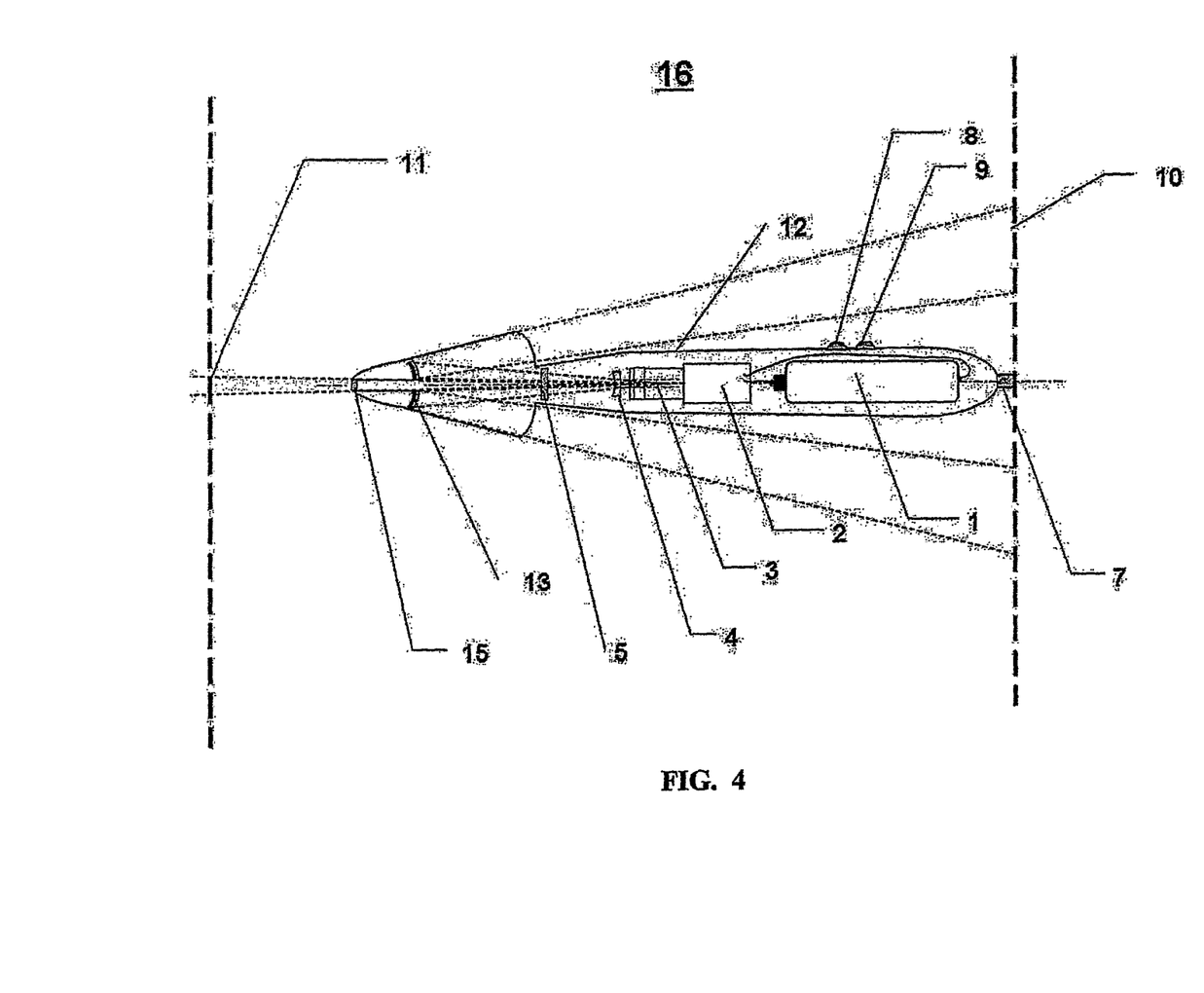
FIG. 4 is a schematic axial section of a projection device for positioning using transmissive diffractive optical element according to a preferred embodiment of the present invention.
Figure 5:
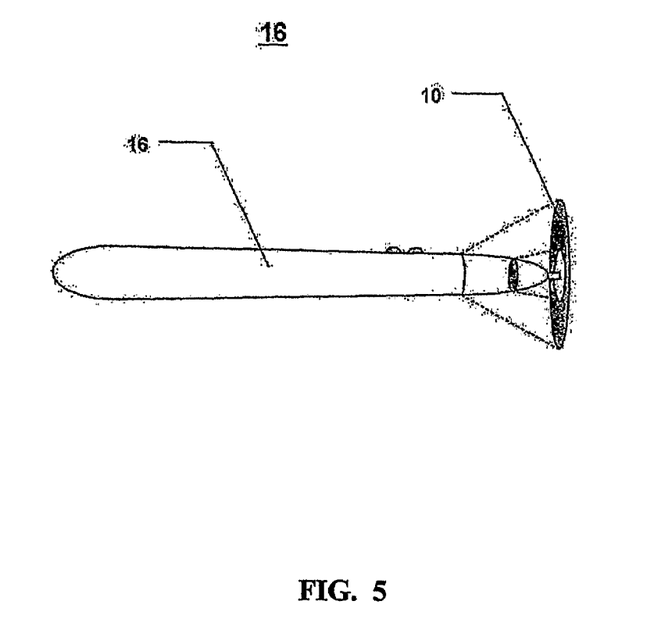
FIG. 5 shows the device operating close to the display screen.
Figure 6:
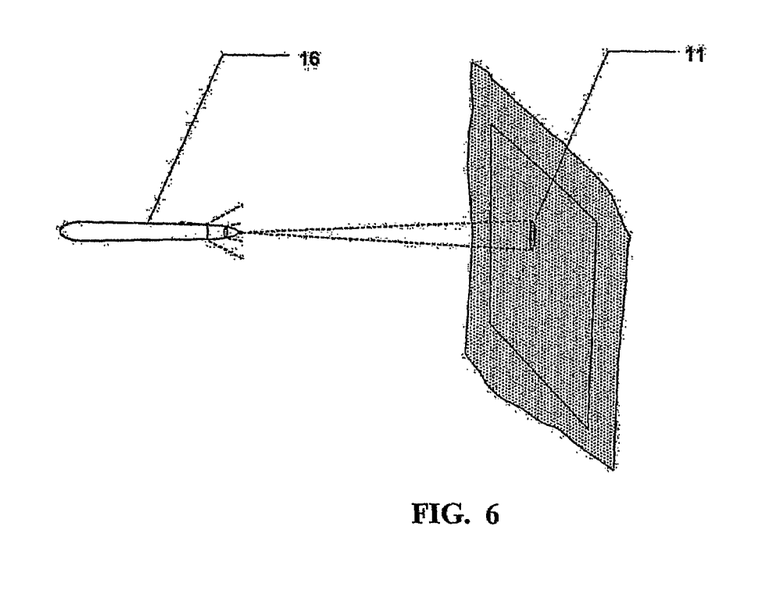
FIG. 6 shows the device operating distant to the display screen.
Figure 7:
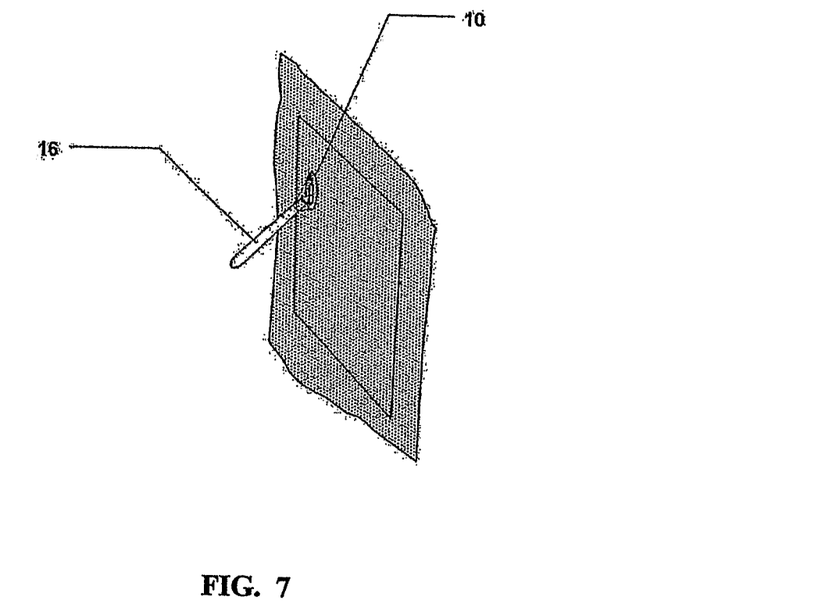
FIG. 7 shows the device in a tilted orientation while operating close to the display screen.
Figure 8:
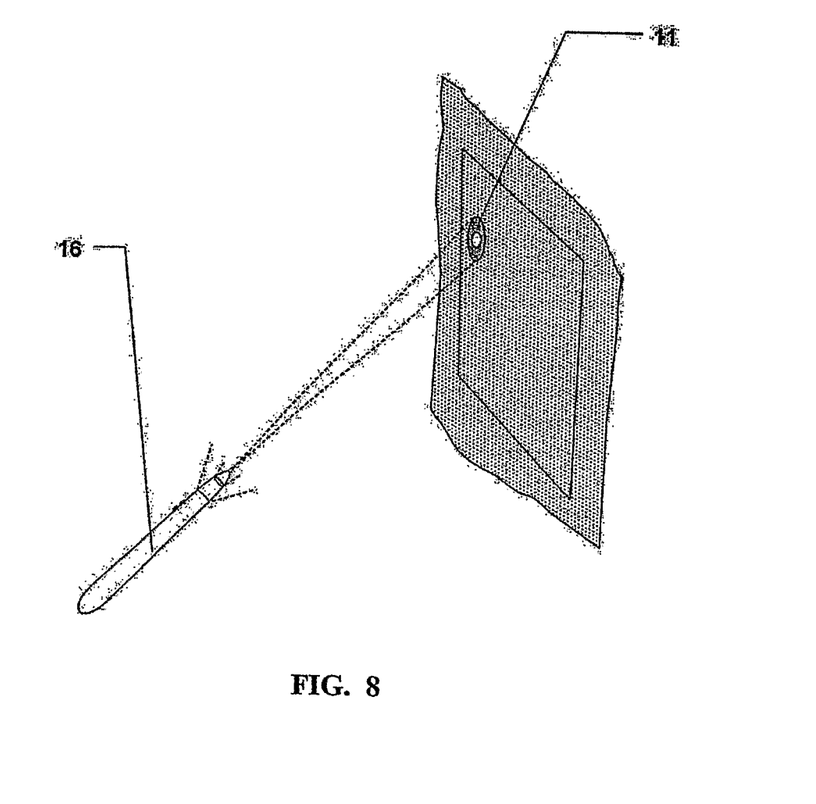
FIG. 8 shows the device in a tilted orientation while operating distant to the display screen.

Referring to FIG. 4, the guiding device 16 (pen, pointer) with a casing 12 has a battery 1, a printed circuit board 2, a laser diode 3, a refractive collimating lens 4, a transmissive diffractive optical element 5 mounted near the rear end 7, a curved annular mirror 13 and a neutral window and/or another transmissive diffractive optical element 15 for the light forming the pattern for distant operation. A resulting pattern 10 is projected from the guiding device to the screen when operated closely, and a pattern 11 is projected from the guiding device to the screen when operated distantly.

The casings 12 of these embodiments have the purpose to resemble a conventional whiteboard marker or pen and to provide the user with a natural, intuitive and ergonomic writing, drawing and pointing tool. One or more battery cells are supplying the energy required to emit light from the light source or a number of light sources. The printed circuit board may provide power management, the interface to the one, two or more button switches, a laser diode driver circuit, and circuits for modulating the laser, a remote infrared link and/or a radio-frequency link. The laser diode may be an infrared or near infrared diode.

The purpose of the collimating lens 4 is to increase the aperture of the laser beam to cover the surface of the diffractive optical element 5. The concave lenses 6 and convex mirrors 13 and possibly 14 are for spreading the pattern to a large area when the guiding device is operated closely to the screen. The annular shape of the mirrors 13,14 and the annular shape of the possibly reflective diffractive optical elements 13,14 makes a free field path for the central part of the laser beam forming the optical intensity image when the guiding device is operating distantly towards the screen.

The guiding object can be held in different orientations and distances to the screen as illustrated in FIGS. 5, 6, 7 and 8. The changes in the projected pattern image position, shape and size can be utilized to find the lateral position, the orientation (elevation and azimuth) and to estimate the distance from the guiding object to the screen surface.

Figure 9:
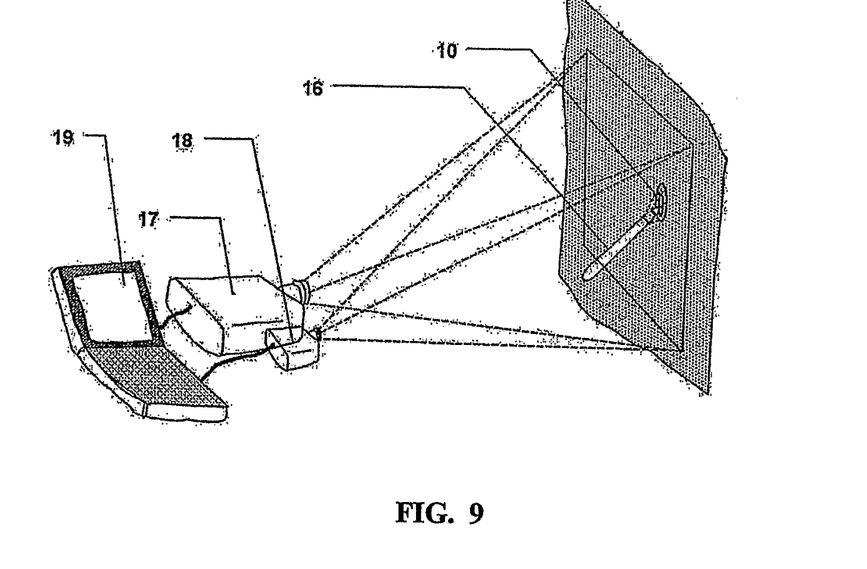
FIG. 9 illustrates a system according to the invention where the camera and recognition apparatus is placed before the front projection screen or possible other display screen, and the projection device is operating closely to the screen.
Figure 10:
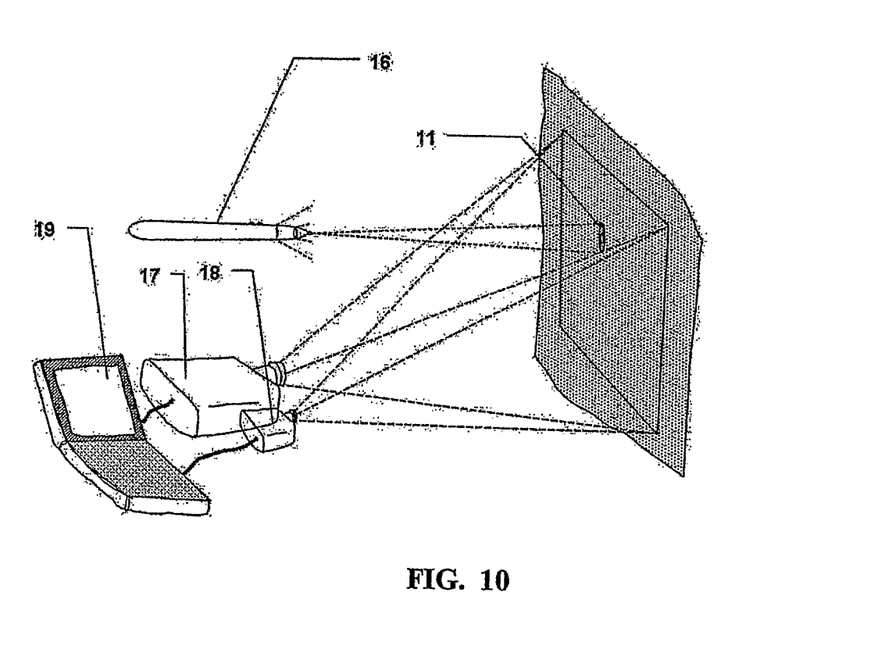
FIG. 10 shows the system of FIG. 9, where the projection device is operating distantly from the screen.

FIG. 9 and FIG. 10 illustrate a situation where the guiding device and the camera and recognition system are located before the front projection screen, the rear-projection screen or other display system, and where the guiding device can be used closely to the screen and distantly to the screen. When close to the screen (FIG. 9) the guiding device may be within the field of view of camera 18. Thus, if the guiding device is provided with a code pattern, there may here be a combined function comprising the method described in WO0227461.

Figure 11:
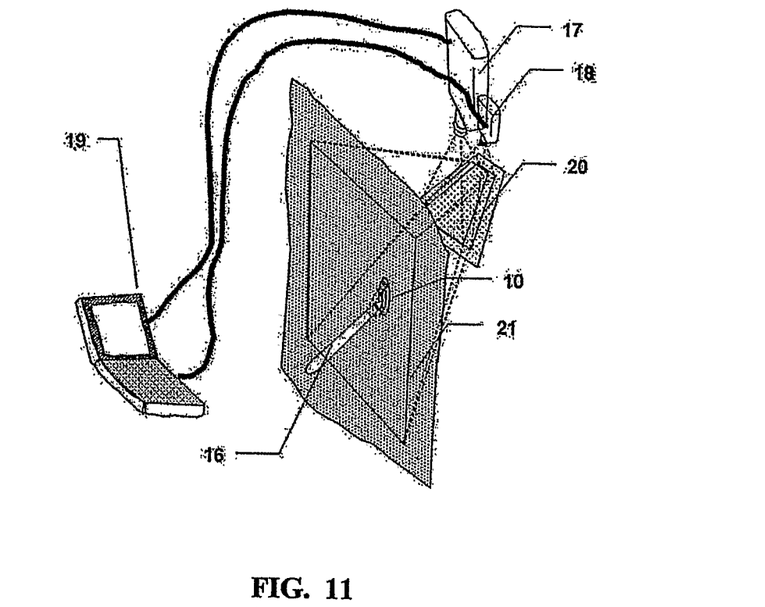
FIG. 11 illustrates a system where a camera and recognition apparatus is placed behind the back projection screen or possible other display screen, and the projection device is operating closely to the screen.
Figure 12:
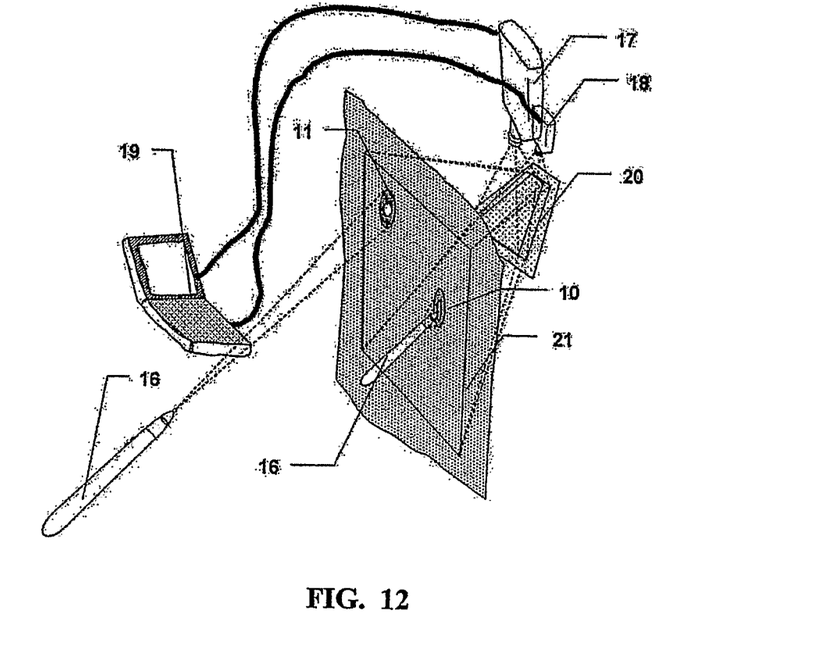
FIG. 12 shows the system of FIG. 11, where the projection device is operating distantly from the screen.

FIG. 11 and FIG. 12 show a configuration where the guiding device are operated before the rear projection screen and can be used closely to the screen and/or distantly to the screen, while the projected pattern image from the guiding device is projected onto the rear projection screen surface, and can be detected by the camera and recognition system located behind the screen close to the projector.

Having described the invention in terms of the preferred embodiments thereof, it will be recognized by those skilled in the art of optical system design that various changes in the configurations and details of the implementations can be made without departing from the spirit and scope of the invention, as defined by the following claims.

The invention claimed is:

1. A visual system for presentations, computer supported work or other interactive use of a computer, comprising
   a reference surface adapted to be viewed by one or more users and on which visual information can be displayed,
   a guiding object, such as a pen or pointer, for use in relation to the reference surface, and comprising a light projection device,
   a camera and recognition device adapted to detect, record and transfer information about objects and images being presented on the reference surface, and
   a computer, or computing device, connected to the camera and recognition device for cooperation therewith and receiving output signals as detected and recorded by the camera and recognition device,
   wherein the light projection device comprises a diffractive optical element and an optical system, and is adapted to emit light forming coded pattern images being essentially not visible to the human eye on the reference surface whereas the camera and recognition device are adapted to detect and record said coded pattern images, the coded pattern images including a first image to be projected at a distant position from reference surface and a second image, different from the first image, to be projected at a near position from the reference surface.

2. System according to claim 1, wherein the light projection device is adapted to emit visible light with low intensity.

3. System according to claim 1, wherein the light projection device is adapted to emit infrared or near-infrared light.

4. System according to claim 1, wherein the diffractive optical element of the light projection device comprises phase-only at least two discrete phase levels diffraction gratings.

5. System according claim 1, wherein there is established a direct infrared communication link between the guiding object and the camera and recognition device.

6. System according to claim 5, wherein the guiding object comprises an infrared remote type of control unit for transmitting and/or receiving signals in relation to the camera and recognition device.

7. The visual system of claim 1, wherein the light emitted by the light projection device is spread over a projected image.

8. The visual system according to claim 1, wherein the optical system comprises a refractive collimating lens.

9. The visual system according to claim 1, wherein the optical system comprises a reflective diffractive curved annular mirror and a curved annular mirror.

10. The visual system according to claim 1, wherein the optical system comprises a refractive collimating lens, and a curved annular mirror and a neutral window and/or another transmissive diffractive optical element.

11. The visual system according to claim 1, wherein the computer or the computing device is further adapted to detect a distant operation based on the received signal of the first image projected at the distant position, and a near operation based on the received signal of the second image projected at the near position.

12. The visual system according to claim 1, wherein the guiding object is provided with a code pattern detectable when the guiding object is within the field of view of the camera.

13. Apparatus for detecting, recording and transferring information about objects and images presented on a reference surface in a visual system for presentations, computer supported work or other interactive use of a computer, wherein the visual system comprises:

a reference surface adapted to be viewed by one or more users and on which visual information can be displayed;

a guiding object, such as a pen or pointer, for use in relation to the reference surface; and a light projection device, a camera and recognition device adapted to detect, record and transfer information about objects and images being presented on the reference surface, and a computer, or computing device, connected to the camera and recognition device for cooperation therewith and receiving output signals as detected and recorded by the camera and recognition device, wherein the light projection device includes a diffractive optical element and an optical system, and is adapted to emit light forming coded pattern images being essentially not visible to the human eye, on the reference surface, the coded pattern images including a first image to be projected at a distant position from the reference surface and a second image, different from the first image, to be projected at a near position from the reference surface and the camera and recognition device are adapted to detect and record the coded pattern image presented on the reference surface and being essentially not visible to the human eye.

14. The apparatus according to claim 13, wherein the computer connected to the camera and recognition device is provided with a display screen and is adapted to show a representation of the position and movement of said coded pattern image, on the display screen.

15. The apparatus of claim 13, wherein the light emitted by the light projection device is spread over a projected image.

16. The apparatus according to claim 13, wherein the computer is provided with a display screen and is adapted to show a representation of the position and movement of said coded pattern image on the display screen.

17. The apparatus according to claim 13 or 16, wherein the reference surface on which the visual information is presented, is a front or back projection screen, where a data projector is in front of the screen if the reference surface is the front projection screen, and where the data projector is in back of the screen if the reference surface is the back projection screen.

18. A light projection device for use in relation to a reference surface, the light projection device comprising:

a light source for emitting light, a diffractive element for diffracting the light so that coded pattern images are formed, and an optical system for projecting the diffracted light on the reference surface, wherein the coded pattern images include a first image to be projected at a distant position from the reference surface and a second image, different from the first image, to be projected at a near position from the reference surface.

19. The light projection device according to claim 18, wherein the light projection device is used in a guiding object, and the object is provided with a code pattern.

* * * * *